United States Patent [19]

Payne

[11] Patent Number: 4,780,037
[45] Date of Patent: Oct. 25, 1988

[54] FASTENING ASSEMBLIES

[75] Inventor: Sidney H. Payne, Basingstoke, Great Britain

[73] Assignee: ITW Limited, Camberley, England

[21] Appl. No.: 78,605

[22] Filed: Jul. 28, 1987

[30] Foreign Application Priority Data

Jul. 28, 1986 [GB] United Kingdom ............... 8618340

[51] Int. Cl.⁴ .......................................... F16B 37/00
[52] U.S. Cl. .................... 411/433; 411/437; 411/432; 411/512; 411/908; 411/918; 411/947; 24/297; 24/621; 403/406.1
[58] Field of Search ............... 411/433, 432, 437, 918, 411/947, 908, 40, 41, 45, 48, 182, 512, 103, 105, 108; 24/297, 621, 30.5 P; 403/406.1, 407.1, 408.1

[56] References Cited

U.S. PATENT DOCUMENTS

| | | | |
|---|---|---|---|
| 1,467,824 | 8/1923 | Ahlers | 403/408 X |
| 2,403,810 | 7/1946 | Le Bilord | 411/108 |
| 2,592,130 | 4/1952 | Erb et al. | 411/908 X |
| 3,056,852 | 10/1962 | Sachs | 411/60 X |
| 4,356,601 | 11/1982 | Kimura | 24/297 |
| 4,376,605 | 3/1983 | Thomsen | 411/182 X |
| 4,435,111 | 3/1984 | Mizusawa | 411/437 |
| 4,571,136 | 2/1986 | Peek | 411/437 |
| 4,579,493 | 4/1986 | Schaty | 411/908 X |
| 4,647,264 | 3/1987 | Pamer et al. | 403/408.1 |
| 4,680,834 | 7/1987 | Andre et al. | 24/30.5 P |

FOREIGN PATENT DOCUMENTS

| | | | |
|---|---|---|---|
| 803184 | 1/1969 | Canada | 411/41 |
| 153489 | 9/1985 | European Pat. Off. | 411/433 |
| 1625262 | 2/1970 | Fed. Rep. of Germany | 411/41 |
| 1956356 | 10/1971 | Fed. Rep. of Germany | 403/408 |
| 1505107 | 12/1967 | France | 24/297 |
| 742639 | 6/1980 | U.S.S.R. | 411/433 |
| 1307430 | 2/1973 | United Kingdom | 411/41 |

Primary Examiner—Gary L. Smith
Assistant Examiner—Curtis B. Brueske
Attorney, Agent, or Firm—Schwartz & Weinrieb

[57] ABSTRACT

A fastening assembly comprises a first internally open member such as a collar, and a second internally open member such as a bifurcated plug which is slidable realative to the collar to an assembled position in which the plug is located at least partially within the collar, at least one protrusion provided between the collar and the plug causing the plug to be deformed when in said assembled position, so as to create at least one inwardly directed jaw or fang for use in fastening engagement with a workpiece such as an externally threaded stud located at least partially within the plug, the advantage being that the amount of driving force which is transmitted in the driving direction to the stud through means of the fastening assembly can be minimized, so that the fastening assembly can have a knock-on/screw-off capability even if the stud is resiliently mounted on compressible foamed material.

20 Claims, 2 Drawing Sheets

FASTENING ASSEMBLIES

FIELD OF THE INVENTION

The present invention relates to fastening assemblies which are capable of being initially secured to workpieces by being driven or pushed even if the fastening assemblies are capable of being subsequently released from the workpieces by being rotated or unscrewed.

BACKGROUND OF THE INVENTION

It is known for a washer to have slots extending radially outwardly from its inner edge so as to allow it to be pushed with a ratchet action along a stud. The washer may merely form part of a larger fastening device such as a cap or a nut as described hereinafter. The stud may be formed with just a single circumferentially-extending rib or groove with which the washer is to ratchet into engagement. More usually, however, the stud would be formed with a longitudinally-extending series of the ribs or grooves. Again, the stud may merely form part of a larger workpiece.

If the washer is not intended to be removable from the stud, it may form part of a cap so as to conceal or protect the free end of a ribbed or grooved stud, and may be much more difficult to pull-off than to push-on.

If the washer is intended to be removable from the stud, it may form part of an internally threaded nut having external torque faces for allowing the nut to be rotated relative to an externally threaded stud, such a nut sometimes being referred to as a knock-on/screw-off nut.

A particular disadvantage of this known prior art arises when the stud is resiliently mounted so that the stud travels for an undesirable distance with the washer, cap or nut, with no relative movement therebetween, as an attempt is made to drive the washer, cap or nut longitudinally onto the stud thereby requiring relative movement therebetween.

It is known, for example, for an externally threaded stud to be carried by means of a layer of foamed material forming part of a seat for a vehicle. The free end of the stud is to pass through an aperture in a seat panel, or an aligned pair of apertures in a twin-skin seal panel, so as to permit fastening with an internally threaded nut. It would be desirable for the nut to be a knock-on/screw-off nut. However, the foamed material is such that it would resiliently compress if an attempt was made to drive or knock the nut onto the stud. The free end of the stud might be pushed back through or into the seat panel before the nut could ratchet into engagement with the stud. Even if the nut could be secured to the stud, the foamed material carrying the stud would resiliently return to its original condition when the driving force on the nut was removed. This would move the nut away from the seat panel thus resulting in an unacceptably loose fixing of the foamed material to the seat panel.

OBJECT OF THE INVENTION

An aim of the present invention has been to overcome this particular disadvantage, with a view to achieving a knock-on/screw-off capability in the above-noted practical application, although it will be appreciated that the present invention should find favour in other more general applications which might not make full use of its capabilities.

SUMMARY OF THE INVENTION

According to the present invention, a fastening assembly comprises a first internally open member, and a second internally open member which is slidable relative to the first member to an assembled position in which the second member is located at least partially within the first member, at least one protrusion provided between the first member and the second member causing the second member to be displaced radially inwardly, when in the assembled position, so as to create at least one inwardly directed portion for use in fastening engagement with a workpiece located at least partially within the second member.

An advantage of the present invention is that the amount of driving force which is transmitted in the driving direction to the workpiece through means of the fastening assembly can be minimized. The result is that even if the workpiece is resiliently mounted it need not travel for any great distance with the fastening assembly while the fastening assembly is being secured thereto.

In a preferred embodiment, nevertheless, either or both of the first and second members is provided with resiliently deformable sealing means. A seal between the first and second members may act to resist passage of dirt or water into the fastening assembly. A seal between the first member and an adjacent support, which may or may not form part of the workpiece located at least partially within the second member, may not only resist passage of foreign matter therebetween, but may also provide a restoring force to the fastening assembly. For example, in the above-noted practical application of a stud carried by means of foamed material, a resiliently deformed seal between the first member nd the seat panel could serve to pull the free end of the stud in the direction of the first member through the seat panel. This could more than overcome any slight compression of the foamed material during creation of the fastening assembly upon the stud and thereby permit the stud to be held in tension.

Preferably, latch means secures the first member and the second member together, when in the assembled position.

It is conceivable that the at least one protrusion could be directed outwardly from the second member, or that complementary protrusions could be formed on both the first and second members, but preferably the first member includes an outer collar and the second member includes an inner plug which is bifurcated so as to define a pair of legs, the at least one protrusion being directed inwardly from the collar so as to displace the free ends of the legs of the plug, when in the assembled position.

Preferably, the latch means includes a bar spanning the collar, and a pair of ramps formed respectively on the inner surface of each of the legs of the plug, the ramps leading to a pair of shoulders which snap into abutment with the bar, when in the assembled position.

In a preferred embodiment, moreover, either or both of the first and second members is provided with torque or transmitting means. The first member may, for example, have an outer polygonal profile so as to assist rotation thereof by means of a spanner. The second member may, for example, have an appropriate recess so as to assist rotation thereof by means of a blade-headed or cruciform-headed screw driver. As the first and second members are preferably secured together by the latch means, when in the assembled position, application of torque to either of the first and second members should be transmitted to the other so that the entire fastening assembly cold be unscrewed from an externally threaded workpiece. It may be appropriate to mention here that the fastening assembly could alternatively be threadedly engaged in the opposite rotary sense so as to permit re-application of the fastening assembly after its removal for example during maintenance or repair.

There may be two protrusions on the collar which are preferably separated, rather than being formed as a continuous rib. The outer surface at the free end of each of the legs of the plug is preferably a prolongation of the remainder of the outer surface, rather than being formed as a cam follower. The inner surface at the free end of each of the legs of the plug is preferably ribbed, rather than being smooth.

The legs of the plug may be guided during their sliding relative to the collar by means of a pair of elongate ribs directed inwardly from the collar, the arrangement being such that the elongate ribs lie in the plane of the bar (if present) spanning the collar and forming part of the latch means for securing the plug within the collar, when in the assembled position.

Preferably, the first member is initially frangibly connected to the second member, and indeed the first member may be integrally formed with the second member as a one-piece plastic molding.

BRIEF DESCRIPTION OF THE DRAWINGS

Two fastening assemblies, in accordance with the present invention, will now be described, by way of example only, with reference to the accompanying drawings, in which.

DETAILED DESCRIPTION OF THE ILLUSTRATED EMBODIMENTS

The accompanying drawings show two fastening assemblies in accordance with the present invention each of which is a one-piece molding of a plastic material such as Nylon 6.6.

Figure 1:
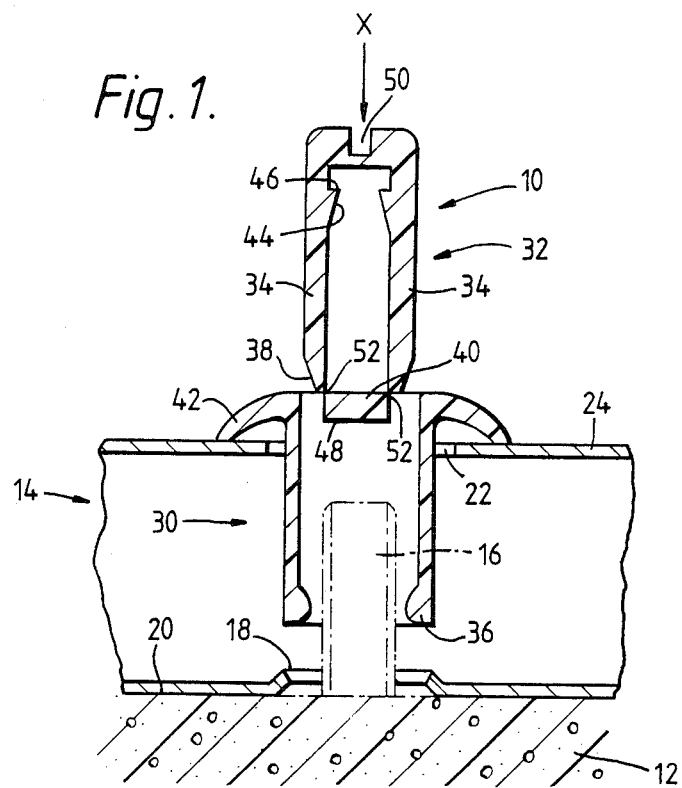
FIG. 1 is a longitudinal section through a fastening assembly in accordance with the present invention before it is driven onto the workpiece and the support shown schematically in longitudinal section.
Figure 2:
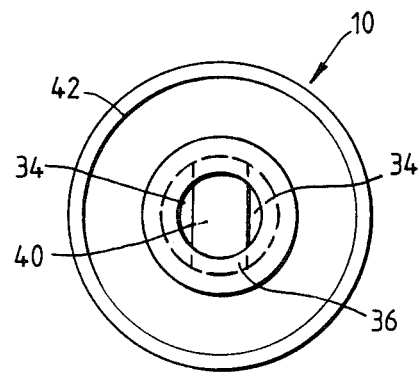
FIG. 2 is a view of just the fastening assembly taken from the lower end of FIG. 1.

The fastening assembly 10 shown in FIGS. 1 and 2 is to be used in fastening a rear seat cushion 12 of foamed resiliently compressible material at a predetermined position relative to a twin-skin rear seat panel 14 made of metal. More particularly, an externally threaded stud 16 carried by means of the cushion 12 is adapted to project through an aperture 18 formed in an inner skin 20 of the panel 14 so that the fastening assembly 10 can be introduced through an aligned aperture 22 in an outer skin 24 of the panel 14 and be secured to the free end of the stud 16. In the desired position of use, the fastening assembly 10 tightly abuts the outer skin 24 and pulls on the stud 16 so as to bring the cushion 12 into tight abutment with the inner skin 20.

It should be noted that, because the fastening assembly 10 extends into the space defined between the inner and outer skins of the panel 14, the stud 16 does not need to be long enough to extend through the aperture 22, with a consequent saving in cost of material.

The fastening assembly 10 includes an outer collar 30, comprising a first internally open member, which is initially frangibly connected to but is subsequently slidable relative to an inner plug 32 which is bifurcated so as to define a pair of legs 34 and which comprises a second internally open member. A protrusion in the form of a continuous annular rib 36 is directed inwardly from one end of the collar 30. An outer surface at the free end of each of the legs 34 is formed as a cam follower 38. A bar 40 of rectangular cross-section spans the other end of the collar 30, with a resiliently deformable annular dished seal 42 extending outwardly of the other end of the collar 30. The inner surface of he collar 30 is cylindrical except at the rib portion 36, and the outer surfaces of the legs 34 are partially cylindrical except at the cam follower portions 38. A ramp 44 is formed on the inner surface of each of the legs 34, the ramps 44 leading to a pair of shoulders 46 which are for snapping into abutment with the bar 40. To assist this engagement, the undersurface 48 of the bar 40 to abut the shoulders 46 may be concave rather than planar. The outer surface of the closed end of the plug 32 includes a slot 50 for facilitating transmission of torque from a blade-headed screw driver.

In use, the plug 32 is driven in the direction X from its initial condition as shown in FIGS. 1 and 2 so as to break its frangible connections 52 with the bar 40.

The plug 32 slides within the collar 30, which remains stationary, without contacting the stud 16 until the cam followers 38 reach the rib 36. With continued driving of the plug 32, the free ends of the legs 34 are displaced inwardly to create a pair of inwardly so as directed jaws which enter the helically extending grooves or threads in the stud 16. This contact of the plug 32 with both the stud 16 and the collar 30 gives rise to some slight movement of both the stud 16 and the collar 30 in the driving direction X. At the same time, the ramps 44 begin to move past the bar 40 and the seal 42 begins to be flattened out. When an assembled position is reached, in which the plug 32 is located almost fully within the collar 30, the shoulders 46 snap into abutment with the undersurface of the bar 40 so that the plug 32 and the collar 30 latch together, the seal 42 resiliently deforms into surface abutment with the outer skin 24 of the panel 14, and the free ends of the legs 34 are displaced to their greatest extent so as to give a secure fastening engagement with the helically extending thread or threads on the stud 16. Finally, removing the driving force allows the seal 42 to return to its original dished condition, and in so doing the stud 16 is pulled in the direction opposite the direction X so as to offset its earlier slight movement in the direction X.

It will be appreciated that the plug 32 and the collar 30, which are now secured together, can be subsequently unscrewed from the stud 16 as a single unit by the application of a screw driver to the slot 50, and indeed could later be reapplied by threading the same onto the stud 16.

It should also be appreciated that various modifications are possible. For example, the collar could be provided with outwardly extending resiliently deformable arms for snapping into engagement with the outer skin of the panel in situations where the fastening assembly is intended to remain captive. Moreover, the initially integrally formed fastening assembly could itself be integrally with a plurality of similar fastening assemblies in a strip for use in magazine loading of an assembly tool.

Figure 3:
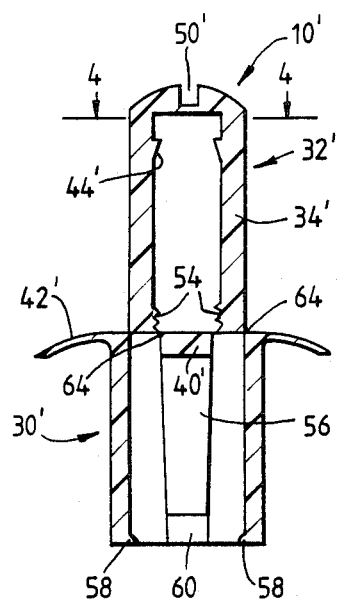
FIG. 3 is a longitudinal section through a modified fastening assembly in accordance with the present invention.
Figure 4:
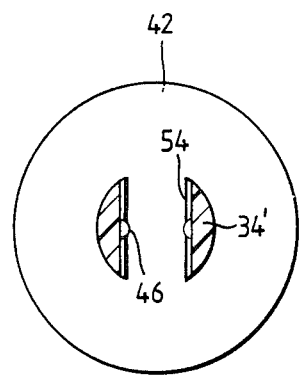
FIGS. 4 and 5 are, respectively, a transverse section taken on the line 4—4 of FIG. 3, and a view taken from the lower end of FIG. 3.
Figure 5:
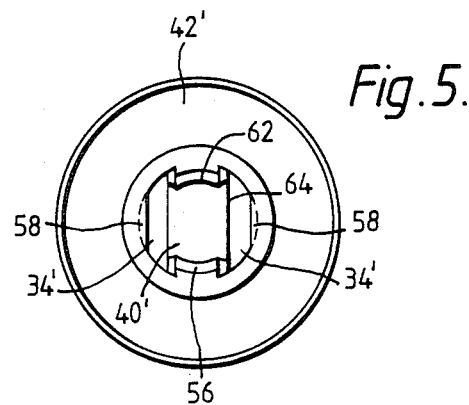

Some other modifications are illustrated in the modified fastening assembly shown in FIGS. 3 to 5. For ease of understanding, constructional features of the same function have been given the same references as those for the fastening assembly shown in FIGS. 1 and 2. The modified fastening assembly 10 shown in FIGS. 3 to 5 thus includes an outer collar 30 and an innter plug 32 which is to be driven into latching engagement with the outer collar 30.

There are several differences to which attention should be drawn. The legs 34 of the plug 32 of the modification do not include cam followers 38, but are partially cylindrical along their entire outer surfaces so as to enhance the creation of the inwardly directed displacements when the plug 32 has been driven into the collar 30. The inner surface at the free end of each of the legs 34 of the plug 32 of the modification includes ribs 54, rather than being smooth, so as to enhance the grip of the inwardly directed displacements with the workpiece, such as the externally threaded stud 16. The legs 34 of the plug 32 of the modification are guided during their sliding movement relative to the collar 30 by means of a pair of elongate ribs 56 directed inwardly from the collar 30. This helps ensure that the free ends of the legs 34 of the plug 32 are displaced inwardly rather than laterally. As a result, there is no longer a continuous annular rib 36 but instead a pair of diametrically oppositely spaced protrusions 58. The lower ends of the elongate ribs 56 may be chamfered as shown at 60, and the inner surfaces of the elongate ribs 56 may be curved as shown at 62, so as to assist in the location of the workpiece which is to be secured. The free ends of the legs 34 of the plug 32 of the modification are frangibly connected by means of thin webs 64 around their entire peripheries to the adjacent parts of the collar 30.

It will thus be appreciated that the present invention, in both of the above described embodiments, comprises a first internally open member 30, and a second internally open member 32 which is slidable relative to the first member 30 to an assembled position in which the second member 32 is located at least partially within the first member 30, at least one protrusion 36 or 58 provided between the first member 30 and the second member 32 causing the second member 32 to be displaced inwardly, when in the assembled position, so as to create at least one inwardly directed jaw or tang for use in fastening engagement with a workpiece 16 located at least partially within the second member 32, the advantage being that the amount of driving force which is transmitted in the driving direction X to the workpiece 16 through means of the fastening assemblies 10 can be minimized.

Obviously, many modifications and variations of the present invention are possible in light of the above teachings. It is therefore to be understood that within the scope of the appended claims, the present invention may be practiced otherwise than as specifically described herein.

I claim:
1. A fastening assembly, comprising:
a first internally open member;
head means, disposed upon a first end of said first member, for engaging a workpiece means;
a second internally open member which is slidably insertable through said first end of said first member to an assembled position at which said second member is located at least partially within said first member; and
at least one protrusion provided upon a second end of said first member for causing said second member to be displaced inwardly and to be retained at said inwardly displaced position when said second member is disposed at said assembled position relative to said first member so as to create an inwardly directed displacement of said second member for use in fastening engagement with said workpiece means located at least partially within said second member.

2. A fastening assembly according to claim 1, in which latch means secures the first member and the second member together, when in said assembled position.

3. A fastening assembly according to claim 1, in which the first member includes an outer collar and the second member includes an inner plug which is bifurcated to define a pair of legs, the at least one protrusion being directed inwardly from the collar to displace the free ends of the legs of the plug, when in said assembled position.

4. A fastening assembly according to claim 3, in which latch means for securing the first member to the second member includes a bar spanning the collar, and a pair of ramps formed respectively on the inner surface of each of the legs of the plug, the ramps leading to a pair of shoulders which snap into abutment with the bar, when in said assembled position.

5. A fastening assembly according to claim 3, in which the legs of the plug are guided during their sliding relative to the collar by a pair of elongate ribs directed inwardly from the collar.

6. A fastening assembly according to claim 3, in which the inner surface at the free end of each of the legs of the plug is ribbed.

7. A fastening assembly according to claim 1, in which at least one of the first and second members is provided with resiliently deformable sealing means.

8. A fastening assembly according to claim 1, in which at least one of the first and second members is provided with torque transmitting means.

9. A fastening assembly according to claim 1, in which the first member is initially frangibly connected to the second member.

10. A fastening assembly according to claim 9, in which the first member is integrally formed with the second member as a one-piece plastic molding.

11. A fastening assembly according to claim 1, wherein said workpiece means comprises with a resiliently mounted workpiece to which the fastening assembly has been secured.

12. A fastening assembly comprising a first internally open member, and a second internally open member which is slidable relative to the first member to an assembled position in which the second member is located at least partially within the first member, at least one protrusion provided between the first member and the second member causing the second member to be displaced, when in said assembled position, to create at least one inwardly directed displacement for use in fastening engagement with a workpiece located at least partially within the second member, in which the first member includes an outer collar and the second member includes an inner plug which is bifurcated to define a pair of legs, the at least one protrusion being directed inwardly from the collar to displace the free ends of the legs of the plug, when in said assembled position, and in which at least one of the first and seciond members is provided with torque transmitting means, the first member being initially frangibly connected to the second member as well as being integrally formed therewith as a one-piece plastic molding.

13. A fastening assembly as set forth in claim 1, wherein:
    said at least one protrusion comprises an annular rib formed upon an inner annular surface of said first member.

14. A fastening assembly, comprising:
    a first tubular member;
    first engagement latching means provided upon a first end of said first member;
    a second tubular member slidably insertable through said first end of said first member toward an assembled position at which said second member is disposed at least partially within said first member;
    second engagement latching means provided upon a first end of said second member for latched engagement with said first engagement latching means of said first member whereby said second member will be retained at said assembled position relative to said first member; and
    protrusion means provided upon a second end of said first member for causing a seciond end portion of said second member to be displaced inwardly and be retained at said inwardly displaced position when said second member is disposed at said assembled position relative to said first member such that said displaced second end portion of said second member can be used as a fastening engagement with a workpiece to which said fastening assembly is to be secured with said workpiece located at least partially within said second member.

15. A fastening assembly as set forth in claim 14, wherein:
    said first engagement latching means comprises a bar spanning across an opening defined within said first end of said first member; and
    said second engagement latching means comprises a pair of shoulder portions which engage an undersurface portion of said bar of said first member.

16. A fastening assembly as set forth in claim 14, wherein:
    said protrusion means comprises an annular rib.

17. A fastening assembly as set forth in claim 15, wherein:
    said second member comprises a bifurcated member which includes a pair of opposed leg members; and
    said first member comprises opposed spaces, into which said leg members of said second member are inserted, defined between said tubular portion of said first member and said bar spanning said first end opening.

18. A fastening assembly as set forth in claim 14, wherein:
    said first and second members are integrally frangibly connected together prior to insertion of said second member into said first member through said first end of said first member.

19. A fastening assembly as set forth in claim 14, wherein:
    said second end portion of said second member comprises cam followers for engaging said protrusion means of said first member.

20. A fastening assembly as set forth in claim 14, wherein:
    said second end portion of said second member comprises threaded means for engaging said workpiece.

* * * * *